(12) United States Patent  
Rosenzweig et al.

(10) Patent No.: US 9,411,395 B2  
(45) Date of Patent: Aug. 9, 2016

(54) METHOD AND APPARATUS TO CONTROL CURRENT TRANSIENTS IN A PROCESSOR

(71) Applicant: Intel Corporation, Santa Clara, CA (US)

(72) Inventors: Nir Rosenzweig, Givat Ella (IL); Zeev Sperber, Zichron Yackov (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 13/865,463

(22) Filed: Apr. 18, 2013

(65) Prior Publication Data

US 2014/0317422 A1   Oct. 23, 2014

(51) Int. Cl.
G06F 1/32 (2006.01)
G06F 1/26 (2006.01)

(52) U.S. Cl.
CPC .............. *G06F 1/3206* (2013.01); *G06F 1/324* (2013.01); *G06F 1/3296* (2013.01); *G06F 1/26* (2013.01); *Y02B 60/1217* (2013.01); *Y02B 60/1285* (2013.01)

(58) Field of Classification Search
CPC ......... G06F 1/26; G06F 1/3206; G06F 1/324; G06F 1/3296; Y02B 60/1217; Y02B 60/1285
USPC ......................................................... 713/300
See application file for complete search history.

(56) References Cited

U.S. PATENT DOCUMENTS

| | | | | |
|---|---|---|---|---|
| 4,787,031 A | * | 11/1988 | Karger et al. ................ 718/100 |
| 5,926,645 A | * | 7/1999 | Williamson ........ G06F 9/30043 712/215 |
| 2002/0108028 A1 | * | 8/2002 | Nunoe ................ G06F 9/30181 712/233 |
| 2003/0084256 A1 | * | 5/2003 | McKee ........................ 711/152 |
| 2004/0205326 A1 | * | 10/2004 | Sindagi ............... G06F 9/30072 712/226 |
| 2005/0132243 A1 | * | 6/2005 | Edwards .......... H03K 19/00369 713/300 |
| 2008/0072079 A1 | * | 3/2008 | Bieswanger et al. ......... 713/300 |
| 2009/0300329 A1 | * | 12/2009 | Naffziger .............. G06F 1/3203 712/205 |
| 2010/0083009 A1 | | 4/2010 | Rotem et al. |
| 2011/0231635 A1 | * | 9/2011 | Egger ................. G06F 9/30014 712/220 |

(Continued)

FOREIGN PATENT DOCUMENTS

EP             2515200        10/2012

OTHER PUBLICATIONS

International Application No. PCT/US2011/068120, filed Dec. 30, 2011, entitled, "Multi-Level CPU High Current Protection," by Intel Corporation.

(Continued)

*Primary Examiner* — Thomas Lee
*Assistant Examiner* — Volvick Derose
(74) *Attorney, Agent, or Firm* — Trop, Pruner & Hu, P.C.

(57) ABSTRACT

In an embodiment, a processor includes at least one core. The at least one core includes an execution unit and a current protection (IccP) controller. The IccP controller may receive instruction width information associated with one or more instructions of an instruction queue prior to execution of the instructions by the execution unit. The IccP controller may determine an anticipated highest current level (Icc) for the at least one core based on the instruction width information. The IccP controller may generate a request for a first license for the at least one core that is associated with the Icc. Other embodiments are described and claimed.

23 Claims, 9 Drawing Sheets

(56) References Cited

U.S. PATENT DOCUMENTS

| | | | | |
|---|---|---|---|---|
| 2011/0302391 A1* | 12/2011 | Guo | ............... | G06F 1/3206 712/200 |
| 2012/0023345 A1* | 1/2012 | Naffziger | ............... | G06F 1/3206 713/320 |
| 2012/0110352 A1* | 5/2012 | Branover | ............... | G06F 1/206 713/300 |
| 2012/0117403 A1* | 5/2012 | Bieswanger | ............... | G06F 1/3206 713/322 |
| 2012/0166854 A1 | 6/2012 | Rotem | | |
| 2012/0254595 A1* | 10/2012 | Wu | ............... | G06F 1/3203 712/208 |
| 2012/0254641 A1 | 10/2012 | Rotem | | |

OTHER PUBLICATIONS

European Searching Authority, "European Search Report and Written Opinion," dated Oct. 31, 2014, in European application No. EP14163762.

* cited by examiner

METHOD AND APPARATUS TO CONTROL CURRENT TRANSIENTS IN A PROCESSOR

TECHNICAL FIELD

The technical field is power management of a processor.

BACKGROUND

As integrated circuit device scaling continues, current levels consumed by a device such as a processor continue to increase due to a number of factors including an increase in the number of transistors per unit area on a die, introduction of new performance features, an increase in the number of cores in a processor, and reduction in supply voltage while the power envelope remains constant.

Among the deleterious impacts of increased current are a need to design a higher power voltage regulator and system power supply, a need for higher voltage to compensate for IR droop, and a need for better voltage regulators to supply higher current with faster feedback mechanisms.

Maximum current consumption of a device is related to highest demand workload that a device can execute at any given time, and may be associated with a "power virus." The term power virus may refer to a tuned computer program with executable code that causes a high power dissipation of a core. Without a protection mechanism, this high current consumption can impact chip, package and system power delivery design.

DETAILED DESCRIPTION

Modern processor architectures can implement functional blocks, such as vector units or accelerator hardware that can increase a dynamic range of the power/current and carry higher power demands by execution of current "power viruses," e.g., applications that place large current demands on the processor due to high processing demands. Increased power virus current can have severe consequences such as the following examples:

1) A need for higher voltage to compensate for I*R droop, which can result in:
   A) a waste of power as guard band voltage increases to provide the higher voltage. Guard band voltage, as used herein, refers to a voltage at which a processor or portion thereof is configured to operate, and is typically higher than a minimum operating voltage specified for the processor.
   B) Decreased reliability. The need for higher voltage to compensate for the I*R droop can significantly shorten lifetime of the processor.
2) Lower turbo frequency. Turbo frequency refers to a highest operation point, when a core operates at a frequency above a maximum guaranteed frequency, and is related to the maximum current needed for highest current power virus.
3) Package and power delivery cost. Additional capacitors and better voltage regulators (VRs) are needed to supply the higher current, thus increasing package and power delivery costs.
4) Increased system power delivery needs from battery or power supply unit.

There are several types of high power operations (including e.g., vector operations) that can cause a significant increase both in thermal design power of a processor and in "power virus" power scenarios. Among such high power operations are Advanced Vector Execution (AVX) vector operations in accordance with a given Instruction Set Architecture (ISA), such as an Intel® ISA or an ISA of another processor designer. For instance, introduction of AVX3 instructions that provide for 512 bit vector operations (compared to 64 bit operations) can result in high current demands. For example, execution of AVX3 vector operations can result in a power demand that can be more than twice the thermal power design of the processor.

An additional challenge stemming from power viruses is a large swing in current (e.g., dynamic range). A challenge in voltage regulator (VR) design is accommodation of large dynamic range. Because a fast increase current causes a drop in voltage, one way of accommodating a larger dynamic range is to increase the guard band voltage.

Through prediction of a smaller power range of a processor and budgeting power to accommodate the predicted power range, use of large guard band voltages can be reduced due to a smaller dynamic range. To reduce guard band voltage, enforcement of separation of different power levels may need to be accomplished quickly enough, e.g., in a same order of time, as the dynamic range swings.

In one embodiment according to the present invention, power levels may be determined based on instruction width ("data type") determined prior to execution of the instruction, and activity type associated with each instruction execution (event). Establishment of power levels that account for both data type and activity type may result in reduced guard band voltages and may enable higher frequencies of operation.

Embodiments of the invention can account for data type based on information obtained at decode stage, rather than execution stage, to enable faster establishment of finer grain power levels. Separation of the power levels may be implemented by granting "licenses" to cores of a processor based on their predicted maximal current draw for the impending work load. In an embodiment, the licenses are labeled $IccP_0$, $IccP_1$, $IccP_2$, $IccP_3$, etc., where each license corresponds to a workload with a corresponding predicted maximum current value: $Icc_0 < Icc_1 < Icc_2 < Icc_3$. In an embodiment, each core (or other computational element e.g., graphics processing unit) can ask for a different license for each workload, e.g., each set of instructions to be executed. The license request can reflect the expected maximum current draw.

Figure 1:
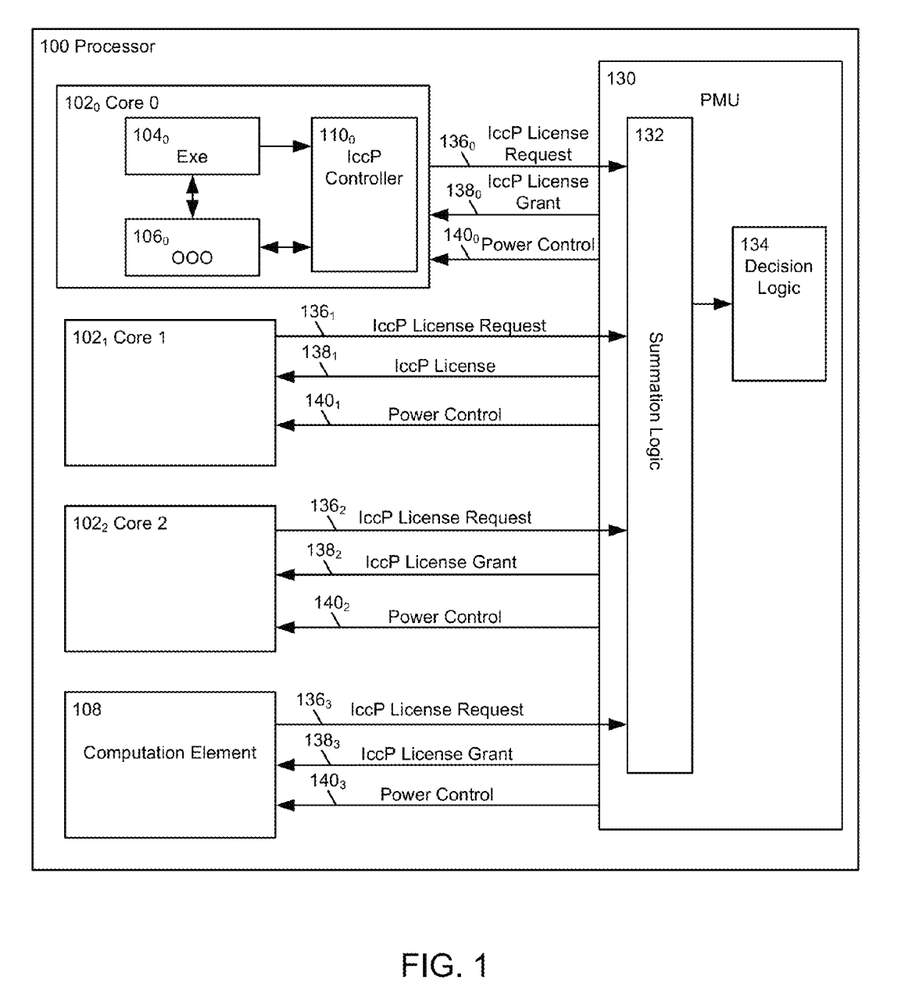
FIG. 1 is a block diagram of a processor, according to an embodiment of the invention.

Referring to FIG. 1, shown is a block diagram of a processor 100, according to an embodiment of the invention. The processor 100 may include a plurality of cores $102_0, \ldots, 102_n$, and optionally at least one other computation element 108, e.g., a graphics engine. Each core $102_i$ (i=1, n) may include (as shown in core $102_0$) an execution unit $104_i$, an out-of-order (OOO) logic unit $106_i$, and an IccP controller $110_i$. For example, core $102_0$ includes execution unit $104_0$, OOO logic unit $106_0$, and IccP controller $110_0$. The processor 100 also includes a Power Management Unit (PMU) 130 that can include summation logic 132 and decision logic 134.

In operation, each of the cores $102_0, \ldots, 102_n$ and the computation element 108 may issue a respective IccP license request $136_0, \ldots 136_n$. Each license request may be determined by a respective IccP controller $110_i$ (e.g., IccP controller $110_0$ of core $102_0$) of the core $102_i$ and the license request may be based on, e.g., a maximum instruction width of a queue of instructions to be executed by the respective execution unit $104_i$ (e.g., execution unit $104_0$ of core $102_0$), and also may be based on a respective activity type of each of the instructions. For example, a size of the license request, e.g., magnitude of the Icc requested, may be determined based on the widest instruction in the queue having the highest activity type.

Each of the cores may ask the PMU 130 for a different license associated with a different level of "power virus" current. The PMU 130 may consider the license requests of the different cores and may determine actions according to the license requests. The actions may include, e.g., changing core frequency according to the license, increasing guard band voltage, or another mechanism that limits the power provided to the core. The PMU 130 may decide, according to the license requested by the core, whether to raise guard band voltage, lose some performance (e.g., reduce core frequency), or another action, or a combination thereof. The PMU 130 may then issue to each core/computation element ($102_0$-$102_n$, 108) its respective license $138_0, 138_1, \ldots 138_n$ (in FIG. 1, $138_0$-$138_3$) that is associated with the maximum expected current draw of the core/computation element.

For example, Out-Of-Order (OOO) logic $106_0$ can determine corresponding widths of the instructions that are in the execution queue to be executed by the execution unit $104_0$ of the core $102_0$. The OOO logic $106_0$ can provide, to the IccP controller $110_0$, an indication of the width of the widest instruction in the queue. For example, if executing 128 bit code, the width of each instruction is 128 bits. If a 256 bit instruction is placed in the queue, then the width of the widest instruction would change to 256 bits. A wider instruction is typically associated with a higher power virus. The IccP controller $110_0$ can determine the IccP license request $136_0$ that is associated with a maximum expected current Icc of the core, based on information provided from the OOO logic 106, and can send the IccP license request $136_0$ to the PMU 130.

The PMU 130 may receive IccP license requests from each of a plurality of the cores $102_0, \ldots, 102_n$ (or from each of the cores/computation element, e.g., $102_0, \ldots, 102_n$, 108) and the PMU 130 may determine a respective license for each of the cores/computation element through a combination of the summation logic 132 and the decision logic 134. For example, in one embodiment the summation logic 132 may sum the current requests in each of the IccP license requests, and the decision logic 134 may determine a respective license $138_0$-$138_n$ based on a sum of the requested Icc of the cores/computation element and total current capacity of the PMU 130. The PMU 130 may issue IccP license $138_0$-$138_n$ to the cores $102_0, \ldots, 102_n$ and may also determine power control parameters $140_0$-$140_n$ for the cores $102_0, \ldots, 102_n$. The power control parameters may include a respective core frequency and/or guard band voltage for each core/computation element. For example, IccP license may be associated with a maximum instruction width. In some embodiments, the IccP license may be associated with an activity level (associated with an activity type), e.g., low activity level or high activity level. In some embodiments the IccP license issued may be associated with a maximum instruction width and an activity level.

If (due to, e.g., a higher than expected current demand) the issued IccP license is not sufficient to accommodate the power requirements of all instructions in the queue, the IccP controller can indicate to, e.g. a front end of the core, that throughput is to be throttled (e.g., execution rate of instructions is to be reduced) and the IccP controller can also issue a request for an updated license having a higher IccP. In an embodiment, the throttling and the request for the license can happen before the first instruction in the queue is executed.

Figure 2:
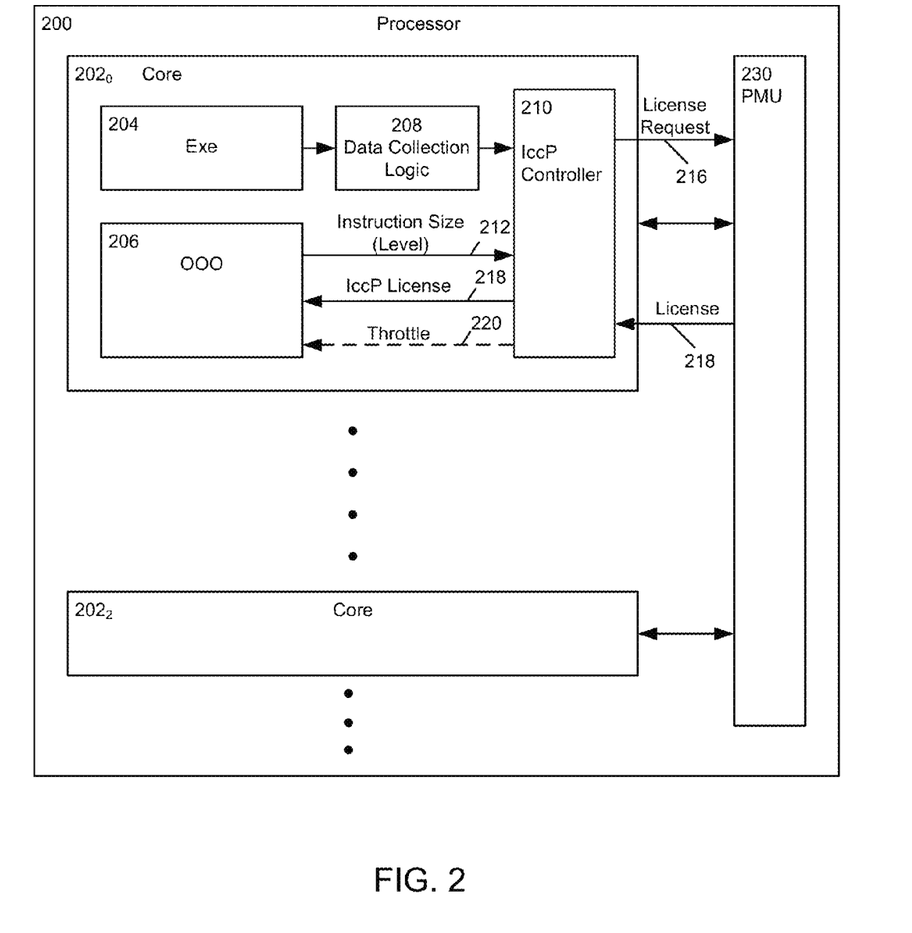
FIG. 2 is a block diagram of a processor, according to another embodiment of the invention.

Referring to FIG. 2, shown is block diagram of a processor 200, according to another embodiment of the invention. Processor 200 includes cores $202_0, \ldots, 202_n$ and PMU 230. The core $202_0$ may include an execution unit 204, OOO logic 206, and IccP controller 210. In an embodiment, the IccP controller 210 may be hardware. In other embodiments, the IccP controller 210 may be firmware, software, or a combination of hardware, firmware, and software.

In operation, the IccP controller 210 may receive instruction size (e.g., instruction width) information 212 associated with instructions in an execution queue, and the IccP controller 210 may determine a license request 216 based on considerations of instruction size and instruction activity type of the instructions as the instructions execute. The license request 216 may be sent to the PMU 230, which may grant an IccP license 218 based on upon license requests received from each of the cores $202_0$-$202_n$. The IccP controller 210 may pass the license 218 to the OOO logic, and if necessary to stay within a current limit associated with the license 218, the IccP controller 210 may throttle throughput via a throttle signal 220 to the OOO logic 206, which in response may throttle instruction feed rate to the execution unit 204. The OOO logic 206 may issue a request for an increased license in response to the need to throttle in order to comply with the presently issued license.

In an embodiment, each core includes data collection logic coupled to the execution unit. For instance, data collection logic 208 may be included in the core $202_0$. Micro-architectural events associated with different activity types (e.g., low activity types including but not limited to integer add, integer subtract, integer multiply, integer divide, and high activity types including but not limited to floating point multiply, vector operations including vector add, vector subtraction, vector division, load of a vector from memory, storing a vector to memory, etc.) may be counted by the data collection logic 208, and the count may including an indication, for each instruction executed, of the corresponding instruction width. For example, a floating point operation consumes more power than an integer operation, and a wider (e.g., 256 bit) instruction consumes more power than a narrower (e.g., 128 bit) instruction.

A weight may be assigned to each event based on, e.g., the activity type and the "level" (e.g., instruction width) of the instruction being executed. The data collection logic 208 may determine a power measure based on the data collected. In one embodiment, the power measure may be calculated as a sum of the weights within an evaluation window of X cycles (e.g., X is a defined number). If the power measure reaches a pre-defined limit, e.g., a threshold, an indication to throttle 220 a rate of instruction execution may be initiated by the IccP controller 210. In various embodiments, calculation of the power measure may occur in the data collection logic 208 or in the IccP controller 210, and comparison to a respective threshold may be occur in the data collection logic 208 or in IccP controller 210.

Once the throttle 220 has initiated, a request for an updated IccP license (e.g., higher Icc value) may be sent to the PMU 230. In response, the PMU 230 may initiate a change of frequency, guard band voltage, duty cycle, a combination thereof, or another adjustment that enables the core run at lower power consumption. The PMU 230 may send to the core $202_0$ the updated IccP license having an updated maximum expected current draw Icc, and the PMU 230 may also send updates of parameters such as guard band voltage, frequency and duty cycle to enable the core $202_0$ to run at or below the updated Icc without throttling instruction flow.

Figure 3:
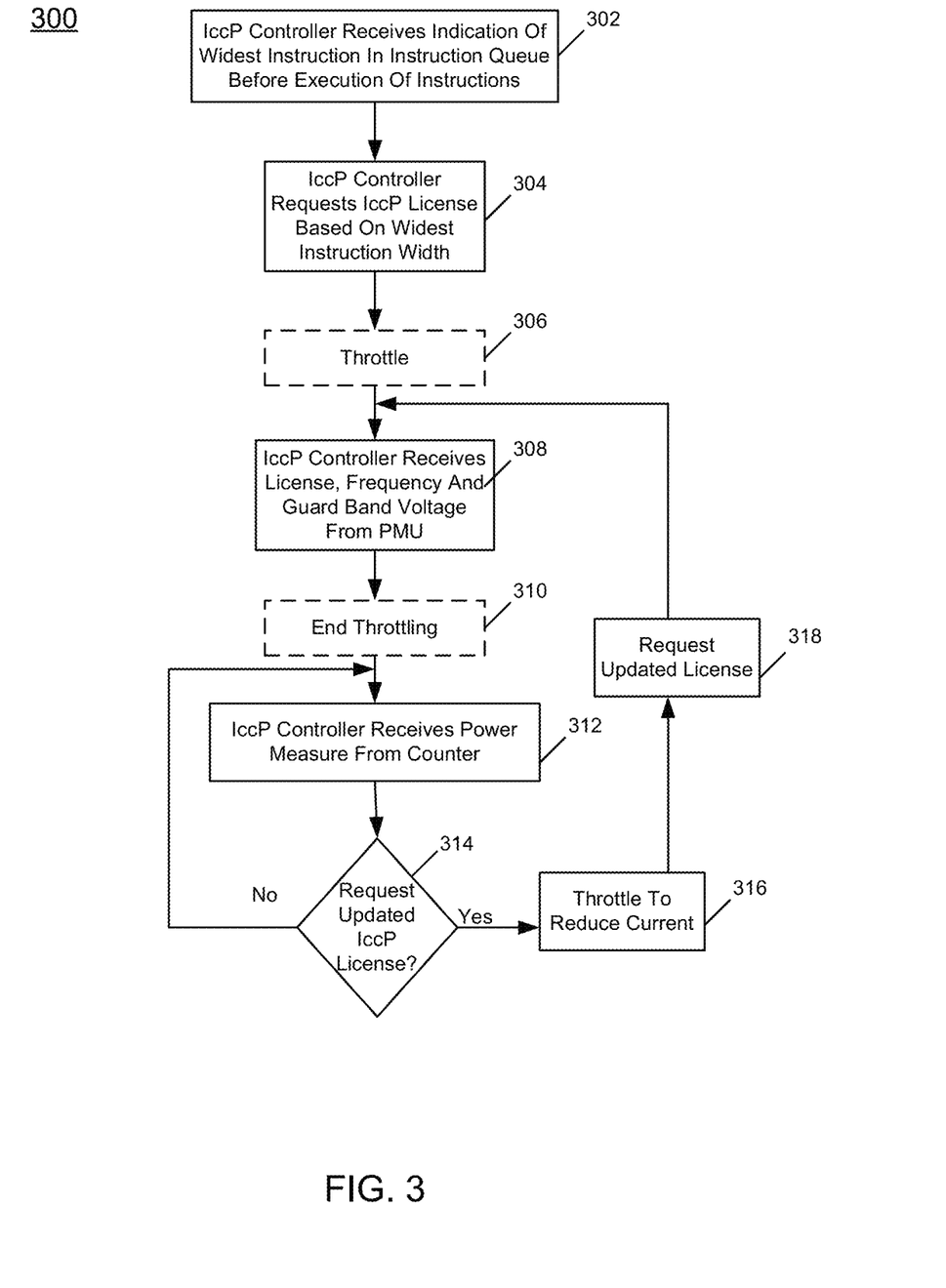
FIG. 3 is a flow chart of a method of controlling current transients, according to an embodiment of the invention.

Turning to FIG. 3, shown is a flow chart of a method of controlling current transients in a processor according to an embodiment of the invention. At block 302, an IccP controller of a core of a processor receives from OOO logic an indication of a widest instruction of an execution queue of instructions prior to processing of the queue. Continuing to block 304, the IccP controller generates and sends an IccP license request based on size information of the widest instruction, to a PMU of the processor. Proceeding to block 306, optionally the IccP controller may implement throttling as a temporary measure until the IccP license is received. Advancing to block 308, the IccP controller receives the IccP license, and receives guard band voltage and core frequency information from the PMU. The processor can process instructions according to these received parameters, e.g., running at a frequency according to the core frequency information and at a voltage according to the guard band voltage. In an embodiment, the IccP license may include an indication of an instruction width and an activity level expected. The processor may compare the indications of instruction width and activity level in the IccP license to actually executed instructions to determine whether to request an updated license, e.g., if the instruction width and/or activity level of the executed instructions is exceeded. Moving to block 310, the IccP controller ends throttling (if invoked at block 306).

Proceeding to block 312, the IccP controller receives information associated with activity and instruction width as instructions are executed, e.g., weighted sum per X cycles, from a counter.

Continuing to decision diamond 314, the IccP controller determines whether to request an updated IccP license based on a comparison of the information received from the counter to a threshold value that is associated with an expected maximum current draw (Icc). If the comparison indicates that an updated IccP license is warranted (e.g., due to execution of instructions with wider instruction width and/or higher activity level than indicated by the issued IccP license), advancing to block 316 the IccP controller sends an indicator (to, e.g., the OOO logic) to throttle instruction execution in order to reduce current draw, and moving to block 318 the IccP controller issues a request for an updated IccP license to the PMU. Returning to block 308, the IccP controller receives the updated IccP license, along with operating frequency and guard band voltage parameter information from the PMU.

If, at the decision block 314, the IccP controller determines not to request an updated IccP license, returning to block 312 the IccP continues to receive the power measure from the counter, e.g., weighted sum of activity/instruction width information per evaluation window (e.g., per X cycles), which can be related to current usage by the core.

Figure 4:
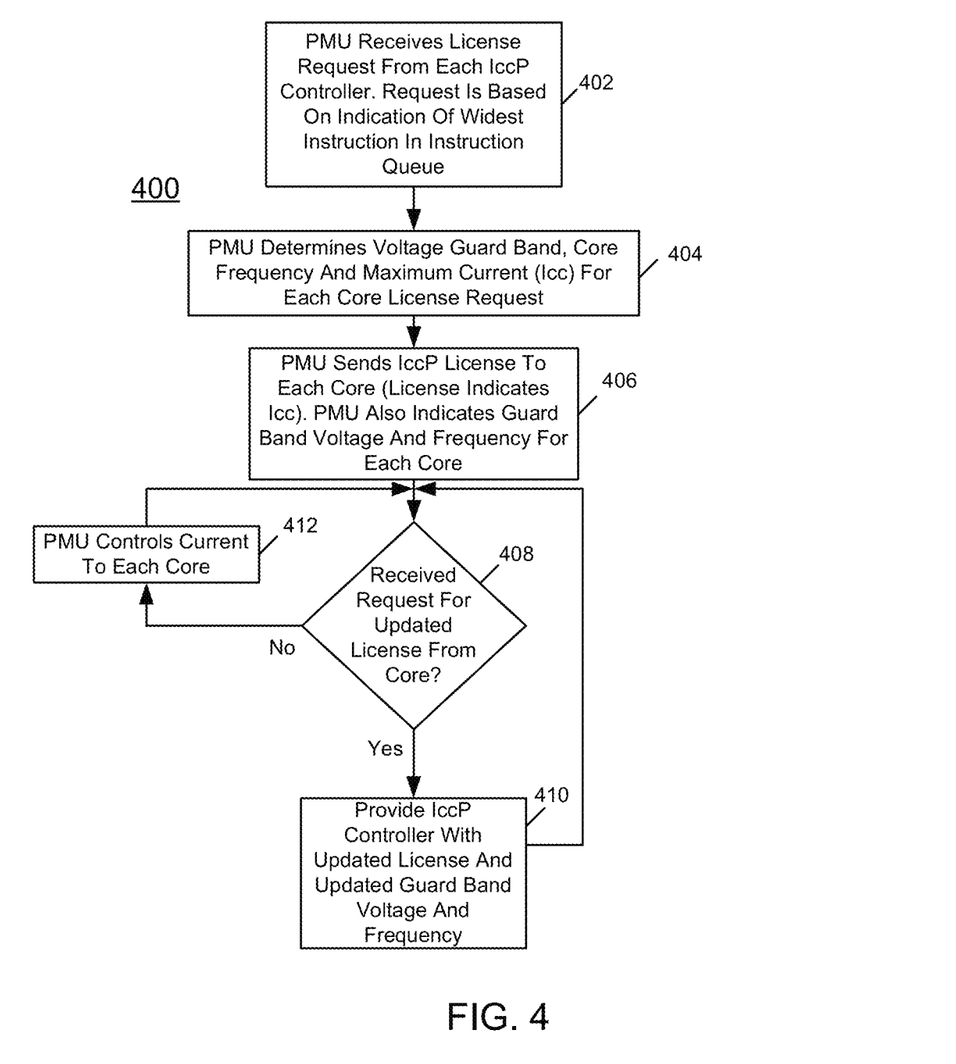
FIG. 4 is a flow chart of a method of responding to a current (IccP) license request, according to an embodiment of the invention.

Referring now to FIG. 4, shown is a flow chart of a method of responding to a current (IccP) license request, according to an embodiment of the invention. Beginning at block 402, a power management unit (PMU) of a processor may receive a respective IccP license request from each IccP controller of one or more cores. The IccP license request may be based on an indication, received from the IccP controller of the core, of a width ("vectorization level") of the widest instruction in the instruction queue of the core prior to execution of the instructions in the instruction queue.

Continuing to block 404, the PMU may determine a respective maximum Icc, guard band voltage and core operation frequency for each core in the processor, based upon all of the license requests and based on a power capacity of the PMU. For example, the PMU may store a power limit table that may be used to determine a guard band voltage and an operation frequency for a core based on the IccP license request received from the IccP controller of the core. Advancing to block 406, the PMU may issue an IccP license, guard band voltage, and operating frequency to each core.

Moving to decision diamond 408, if the PMU receives a request for an updated IccP license from a core (generated by the core IccP controller responsive to, e.g., high current demand by the core due to a heightened instruction activity type (e.g., floating point operations), wide instruction widths, or a combination thereof), moving to block 410 the PMU may provide the IccP controller with an updated license and updated guard band voltage and frequency parameters. Back at decision diamond 408, if no request for an updated license request is received, moving to block 412 the PMU controls current to each core according to the IccP license most recently issued to the core, and returning to decision block 408, the PMU awaits a subsequent license update request.

The calculation of the new voltage/frequency operation parameters and adjustment of the voltage/frequency operating parameters may be time intensive. To ensure a minimal performance hit due to throttling and frequency (P-State) transitions, upon receiving a license, the IccP may refrain from issuance of another request for an updated license for a relatively long time, which can reduce thrashing (e.g., rapid changes in license supplied to a core). In one embodiment, the IccP may refrain from a request to decrease Icc current for a long time period ("hysteresis") as compared with a time period between a first IccP license request for a first Icc current and a subsequent IccP license request for a lower Icc current, because grant of a higher IccP license is more likely to reduce thrashing than grant of a lower IccP license.

Thus, according to the method of FIG. 4, each core may be issued a needs-based current (Icc) usage license that can reduce dynamic range within which to execute each operation, which may result in a more efficient distribution of total power and reduce a need to throttle instruction throughput of one or more cores.

Figure 5:
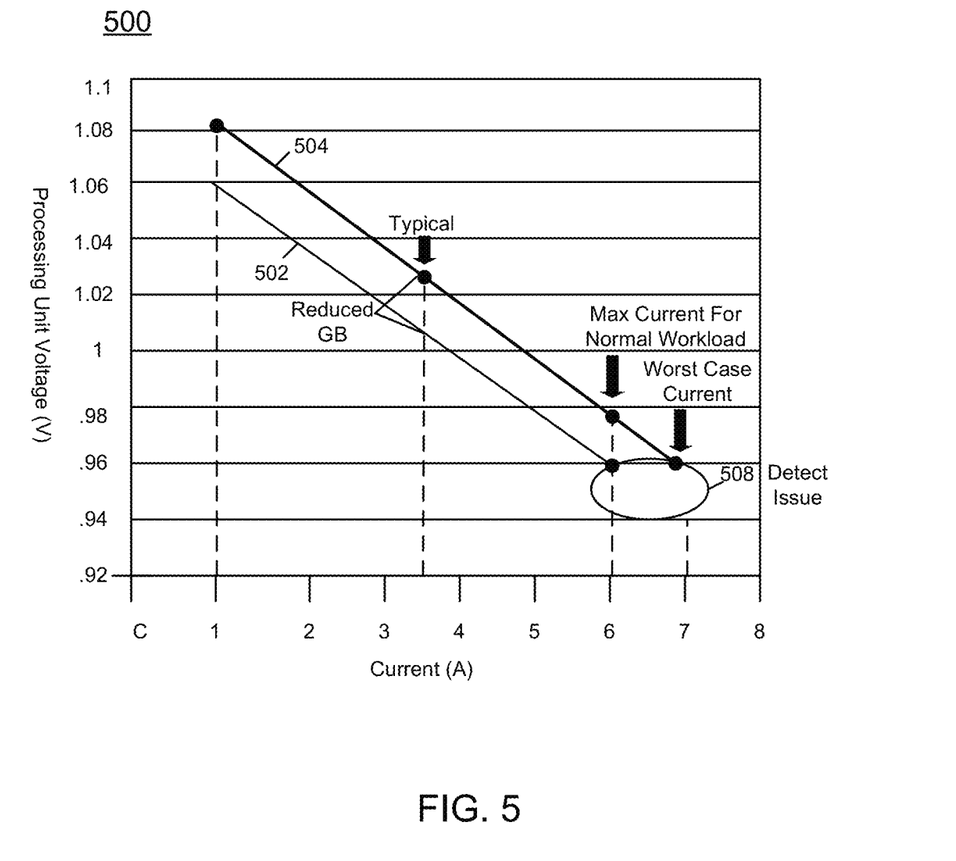
FIG. 5 is a graph of load lines associated with core operation, according to an embodiment of the invention.

Referring to FIG. 5, shown is a graph of load lines associated with core operation, according to an embodiment of the invention. Lines 502 and 504 show expected on-die voltage for a given current. Line 504 represents a system without IccP license issuance in place and indicates a voltage supplied to a core for a range of current draw. Line 502 represents a system with IccP license issuance in place, which can reduce the guard band voltage. For example, a normal workload may have a maximum current draw of 6 amp. with a corresponding voltage delivered of 0.96 volts. If the predicted current draw, determined by evaluation of instruction width (e.g., maximum width of instructions in an instruction queue determined prior to execution of the instruction queue) and activity type (e.g., floating point operation, integer operation, etc. of each instruction) at line 502 exceeds 6 amp., the IccP logic may request and receive an updated IccP license forwarded to the core along with a higher guard band voltage, e.g., load line 504. In other embodiments, there may be several load lines and the core may jump to any of the load lines permitted by an updated IccP license. Prediction of the current draw based on instruction width awaiting execution by an execution unit of a core and activity type of instructions enables the PMU to change the guard band voltage and avoid operation at the worst case current draw, e.g., region 508.

Reduction of the current draw reduces $I^2R$ power losses. In the example presented in FIG. 5, an increase of power efficiency due to reduction of guard band voltage may be ~20 mV that can translate to ~4% power loss reduction.

Figure 6:
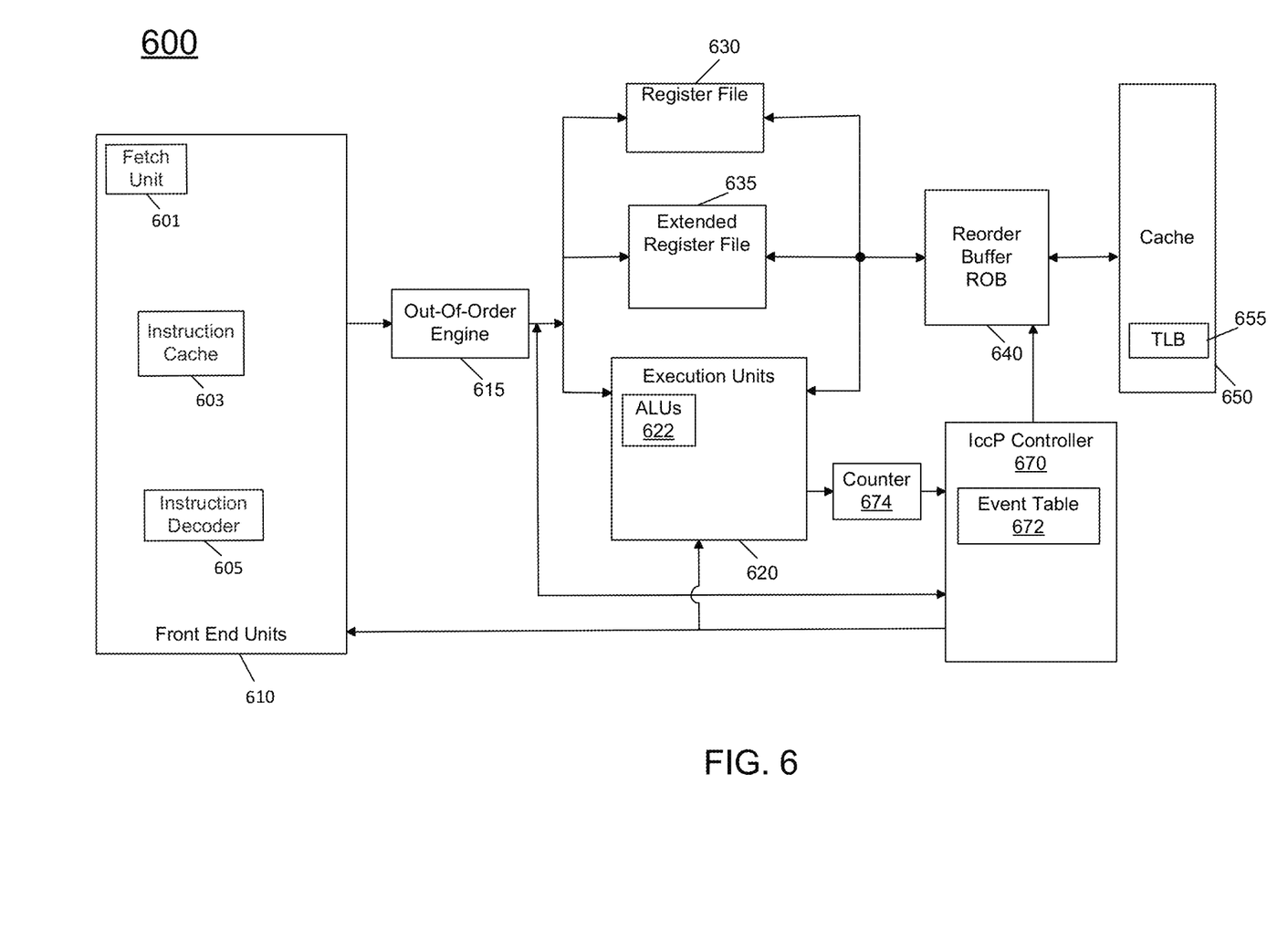
FIG. 6 is a block diagram of a processor core in accordance with one embodiment of the present invention.

Embodiments can be implemented in many different processor types. For example, embodiments can be realized in a processor such as a multicore processor. Referring now to FIG. 6, shown is a block diagram of a processor core in accordance with one embodiment of the present invention. As shown in FIG. 6, processor core 600 may be a multi-stage pipelined out-of-order processor. Processor core 600 is shown with a relatively simplified view in FIG. 6 to illustrate various features used in connection with current transient control in accordance with an embodiment of the present invention.

As shown in FIG. 6, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as instruction storage. Fetch unit 601 may fetch macro-instructions, e.g., from memory or instruction cache 603, and feed them to instruction decoder 605 to decode them into primitives such as instructions for execution by the processor.

Coupled between front end units 610 and execution units 620 is an out-of-order (OOO) engine 615 that may be used to receive the instructions and prepare them for execution. More specifically OOO engine 615 may include various buffers to re-order instruction flow and allocate various resources needed for execution, as well as to provide renaming of logical registers onto storage locations within various register files such as register file 630 and extended register file 635. OOO engine 615 may also provide (e.g., to an IccP controller 670) instruction size information of instructions in an instruction queue (e.g., maximum size of the instructions in the queue) that await execution by execution units 620, according to embodiments of the present invention. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622.

When operations are performed on data within the execution units, results may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 6, ROB 640 is coupled to cache 650 which, in one embodiment may be a low level cache (e.g., an L1 cache) and which may also include TLB 655, although the scope of the present invention is not limited in this regard. From cache 650, data communication may occur with higher level caches, system memory and so forth.

As further seen in FIG. 6, core 600 can include the maximum current protection (IccP) controller 670. IccP controller 670 can be configured to receive information from out-of-order engine 615, including width of the largest instruction of a queue of instructions to be processed. In some implementations, IccP controller 670 can include an event table 672 that includes a list of, e.g., instruction types for which transient currents are likely to occur. In some embodiments these instruction types can correspond to various vector instructions.

A counter 674 can store a count of detected transient currents within an evaluation window (e.g., each evaluation window includes X cycles) and can output a counter value, e.g., weighted sum determined from, e.g., instruction width of each instruction and activity type of each instruction. In some implementations, responsive to the IccP controller 670 determining (e.g., via comparison with threshold values stored in an event table 672) that the counter value exceeds a given threshold and/or that a largest width of instruction exceeds a current license expected width, the IccP controller 670 can send a request for an updated license to a power control unit and that may result in a change in a global operating parameter to reduce a number of transient currents exceeding the Icc of a presently issued license, according to embodiments of the present invention.

As further seen in FIG. 6, the IccP controller 670 can be coupled to the various units of the processor including front end units 610, execution units 620 and ROB 640. Responsive to detection of a transient current, the IccP controller 670 can issue a signal such as a throttle signal to at least one of these units to throttle its operation to thus reduce current consumption in a substantially instantaneous manner. Note that while the implementation of the processor of FIG. 6 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Furthermore, other embodiments may be implemented in a graphics processor. For implementation in a graphics processor, the detection and control can be done based on number of active execution units, special function blocks or so forth.

Figure 7:
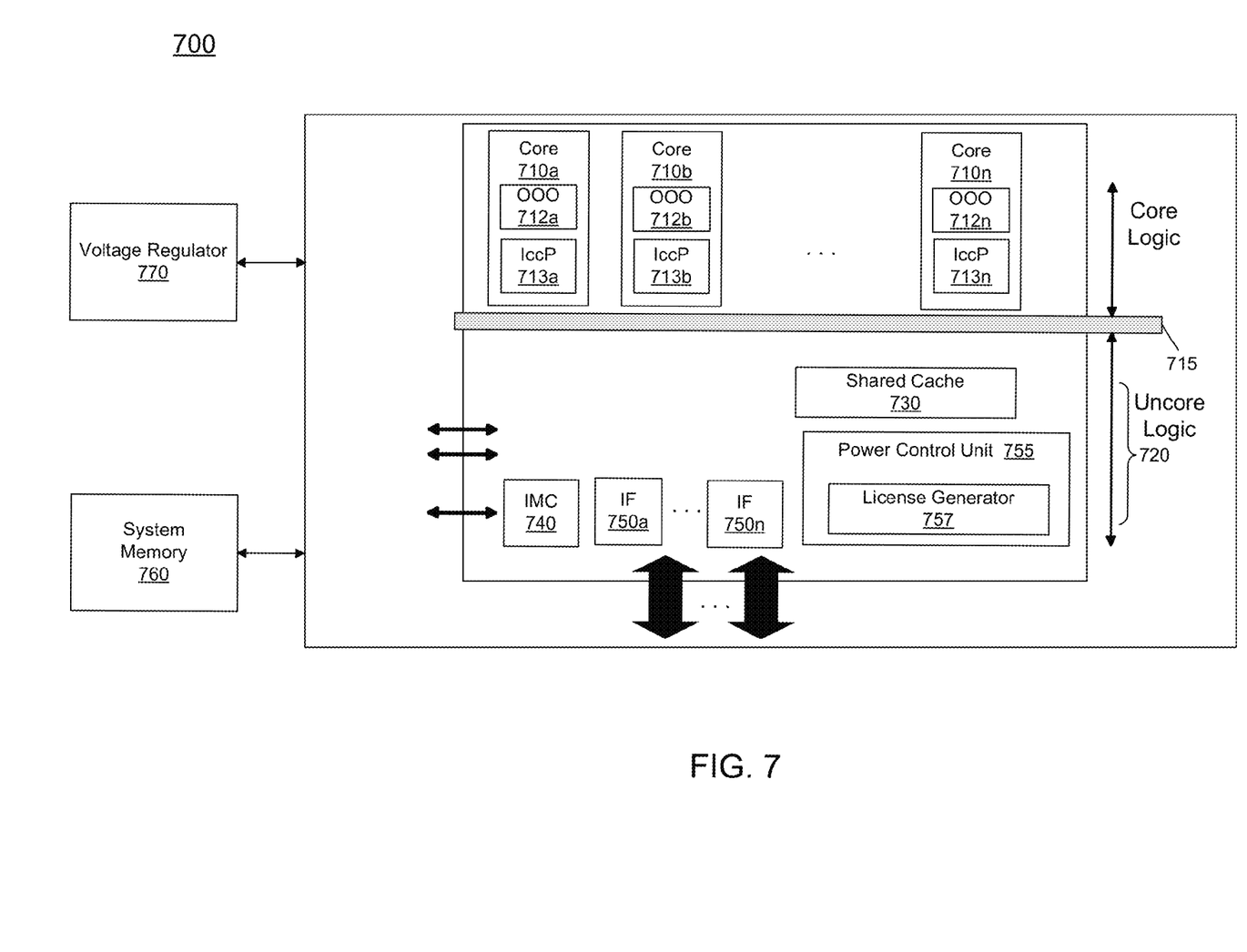
FIG. 7 is a block diagram of a processor in accordance with an embodiment of the present invention.

Referring now to FIG. 7, shown is a block diagram of a processor in accordance with an embodiment of the present invention. As shown in FIG. 7, processor 700 may be a multicore processor including a plurality of cores $710_a$-$710_n$. In one embodiment, each such core may be of an independent power domain and can be configured to operate at an independent voltage and/or frequency, and to enter turbo mode when available headroom exists. As seen, each core can include at least OOO $712_a$-$712_n$ that can provide instruction width information, prior to execution of the instructions, to a transient current logic $713_a$-$713_n$ in accordance with embodiments of the present invention. The various cores may be coupled via an interconnect 715 to a system agent or uncore 720 that includes various components. As seen, the uncore 720 may include a shared cache 730 which may be a last level cache. In addition, the uncore may include an integrated memory controller 740, various interfaces 750 and a power control unit 755. In the embodiment of FIG. 7, power control unit 755 can include a license generator 757. In general, license generator 757 can be configured to generate a license to provide to one or more of the cores due to recurring current transients, according to embodiments of the present invention. In this way, the transient current logic within the core(s) can allow some number of transient currents to occur during the licensed period without triggering a mechanism to throttle instruction execution rate.

With further reference to FIG. 7, processor 700 may communicate with a system memory 760, e.g., via a memory bus. In addition, by interfaces 750, connection can be made to various off-chip components such as peripheral devices, mass storage and so forth. Also shown in FIG. 7 is a voltage regulator 770, which may be controlled, e.g., by PCU 755, to provide a regulated operating voltage to the processor in a manner to reduce and/or quickly respond to current transients. While shown with this particular implementation in the embodiment of FIG. 7, the scope of the present invention is not limited in this regard.

Figure 8:
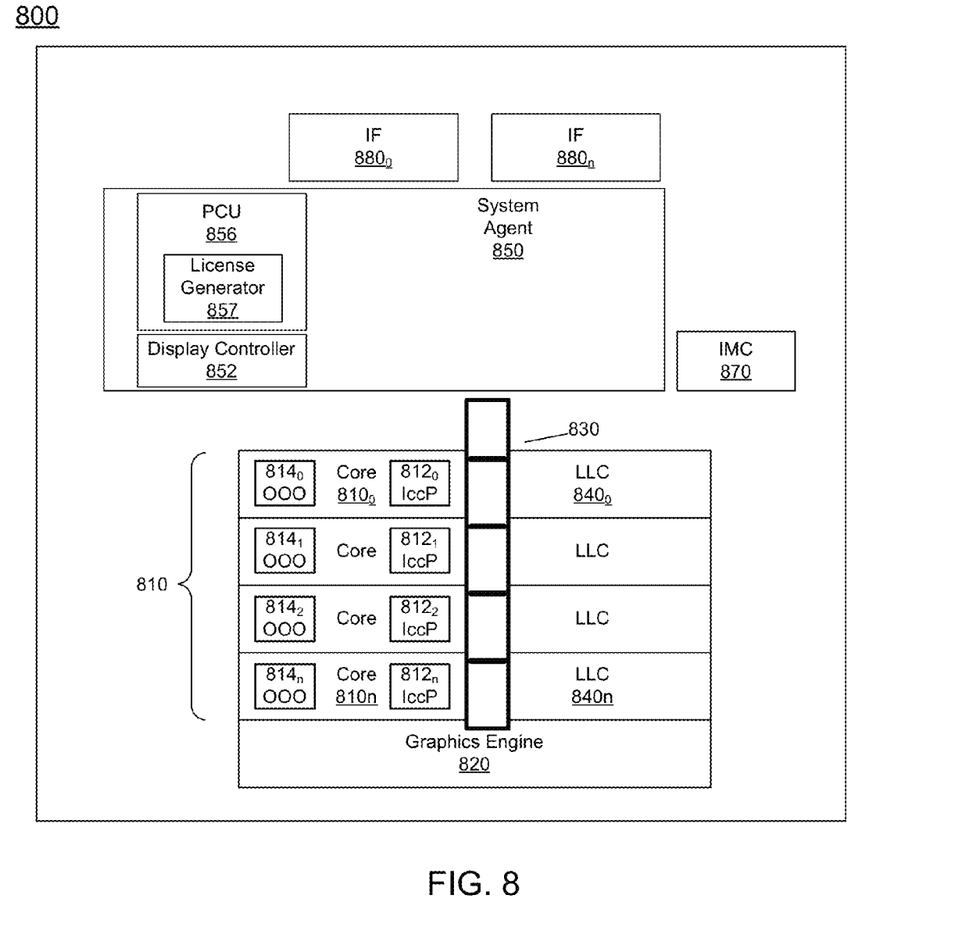
FIG. 8 is a block diagram of a multi-domain processor in accordance with another embodiment of the present invention.

Referring now to FIG. 8, shown is a block diagram of a multi-domain processor in accordance with another embodiment of the present invention. As shown in the embodiment of FIG. 8, processor 800 includes multiple domains. Specifically, a core domain 810 can include a plurality of cores $810_0$-$810n$, a graphics domain 820 can include one or more graphics engines, and a system agent domain 850 may further be present. In various embodiments, system agent domain 850 may execute at a fixed frequency and may remain powered on at all times to handle power control events and power management such that domains 810 and 820 can be controlled to dynamically enter into and exit low power states. Each of domains 810 and 820 may operate at different voltage and/or power. Note that additional domains can be present in other embodiments. For example, multiple core domains may be present each including at least one core.

In general, each core 810 may further include low level caches in addition to various execution units and additional processing elements along with IccP logic $812_0$-$812_n$ and OOO $814_0$-$814_n$ to provide instruction information to the IccP logic $812_0$-$812_n$ including to provide a widest instruction size to the IccP logic $812_0$-$812_n$ to formulate an IccP license request, in accordance with embodiments of the present invention. Similar IccP logic can be implemented within the graphic engine(s) of graphics domain 820. In turn, the various cores may be coupled to each other and to a shared cache memory formed of a plurality of units of a LLC $840_0$-$840_n$. In various embodiments, LLC 840 may be shared amongst the cores and the graphics engine, as well as various media processing circuitry. As seen, a ring interconnect 830 thus couples the cores together, and provides interconnection between the cores, graphics domain 820 and system agent circuitry 850.

As further seen, system agent domain 850 may include display controller 852 which may provide control of and an interface to an associated display. As further seen, system agent domain 850 may include a power control unit 856 to perform power management operations for the processor. In the embodiment of FIG. 8, the power control unit 856 can include a license generator 857 to thus provide IccP licenses to one or more of the cores, as discussed above.

As further seen in FIG. 8, processor 800 can further include an integrated memory controller (IMC) 870 that can provide an interface to a system memory, such as a dynamic random access memory (DRAM). Multiple interfaces $880_0$-$880_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 8, understand the scope of the present invention is not limited in this regard.

Figure 9:
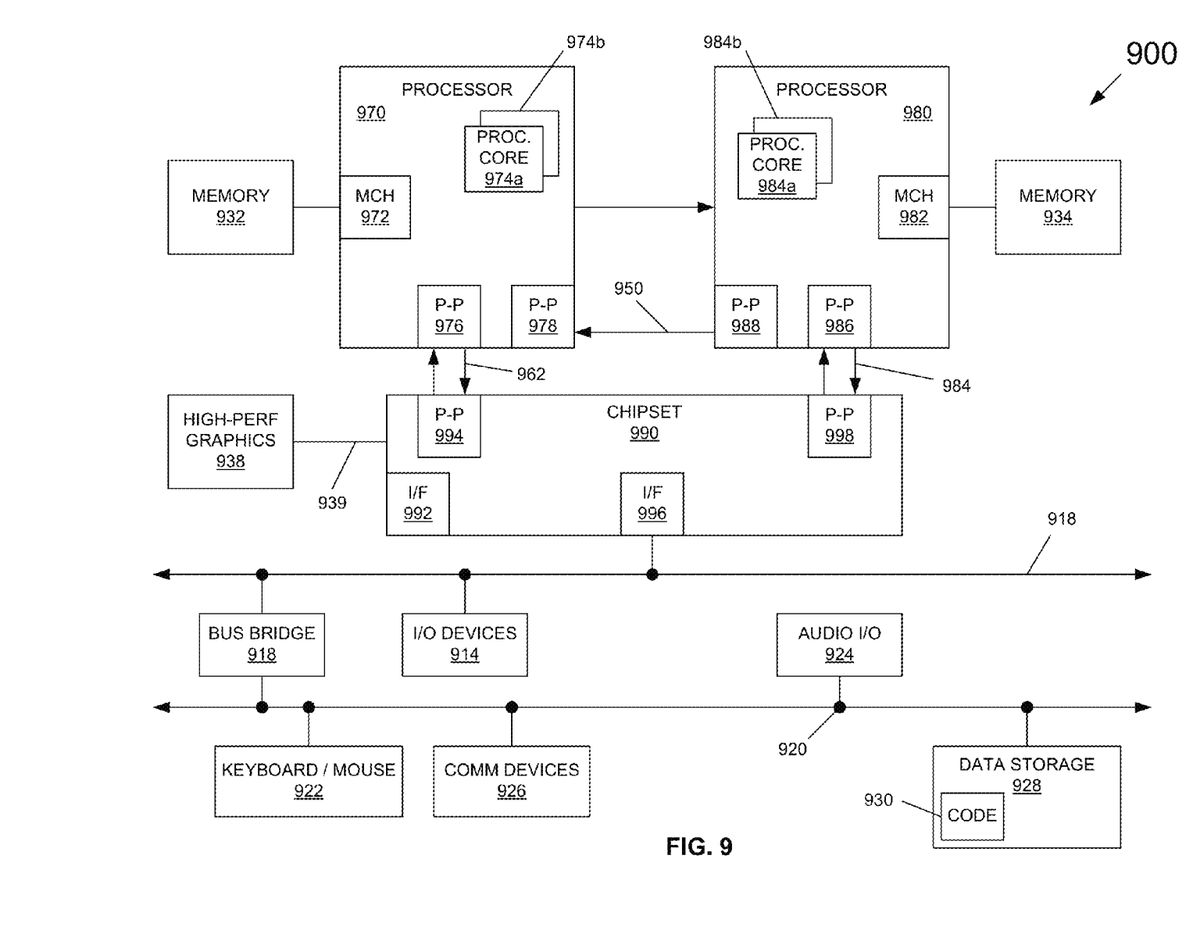
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. Each of the processors can include transient current logic that can determine a license request based on width and activity information of the instructions in a queue in accordance with various embodiments of the present invention, and can detect transient currents, e.g., based on the occurrence of various micro-architectural events and/or voltage droop detections and take appropriate action to control current consumption in a substantially instantaneous manner. In addition, the processors can further include a power controller (e.g., power management unit (PMU)) to receive an indication when an excessive number of such current transients are occurring and to take a global action to reduce the number of current transients, as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 952 and 954, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Embodiments can be incorporated into other types of systems including mobile devices such as a smart cellular telephone, tablet computer, netbook, Ultrabook™, or so forth.

The following examples pertain to further embodiments.

In an example, a processor includes at least one core comprising an execution unit, and the processor also includes a current protection (IccP) controller to receive instruction width information associated with one or more instructions stored in an instruction queue prior to execution of the instructions by the execution unit, to determine an anticipated highest current level (Icc) for the at least one core based on the corresponding instruction width information, and to generate a request for a first license for the at least one core that is associated with the Icc. The processor may be used to process the instructions.

In an example, the processor includes a power management unit (PMU) to provide the first license to the IccP controller in response to the request.

In an example, the PMU is to receive respective license requests from each of a plurality of cores and to grant corresponding licenses in response to the requests, wherein the corresponding licenses are determined at least in part based on a power capacity of the PMU.

In an example, the PMU is to determine a respective action to be taken by each of the cores based on the licenses granted and based on current power needs of each of the cores.

In an example, the PMU is to determine a first action to be taken by the at least one core, the first action including to increase a guard band voltage.

In an example, the first action includes to change a first frequency of the at least one core.

In an example, the PMU includes firmware logic to determine the respective actions.

In an example, the IccP controller is to determine the request based on activity type information associated with one or more of the instructions of the instruction queue.

In an example, the processor includes data collection logic to provide to the IccP controller a power measure associated with execution by the execution unit of a portion of the one or more instructions and based on the corresponding activity type and the corresponding instruction width of each instruction that has executed during an evaluation window of time.

In an example, the IccP controller is to determine whether to throttle an execution rate of the at least one core based at least in part on a comparison of the power measure to a threshold.

In an example, the IccP controller is to determine whether to request an updated license based on a comparison of the power measure to a threshold. In an example, in response to a request of the updated license, the IccP controller is to receive the updated license that is associated with an updated Icc associated with an updated highest anticipated current draw by the at least one core, an updated guard band voltage for the at least one core, and an updated core frequency for the at least one core.

In an example, the processor includes out-of-order (OOO) logic to provide the corresponding instruction width information to the IccP controller prior to execution of the corresponding instruction.

In another example, a method includes receiving, at current protector (IccP) logic of a core of a processor, instruction width information associated with a widest instruction of a queue of instructions to be executed by the core, requesting from a power management unit (PMU) of the processor, a current (Icc) license that is associated with an anticipated Icc of the core, where the request is based at least in part on the received instruction width information, and receiving, by the IccP logic, the IccP license responsive to the request. In an example, the method controls power usage.

In an example, the method further includes receiving a power usage indicator that is associated with a measure of power consumed by the core resulting from execution of the instructions during an evaluation window.

In an example, the method further includes determining whether to throttle execution of subsequent instructions of the instruction queue based on a comparison of the power usage indicator to a threshold value.

In an example, the method further includes responsive to a determination to throttle execution of the subsequent instructions, requesting an updated IccP license from the PMU, and responsive to the requesting, receiving the updated IccP license from the PMU.

In an example, the method further includes responsive to the requesting, receiving updated parameter values that specify at least one of an updated guard band voltage at which to operate the core and an updated frequency of the core.

In an example, an apparatus includes means for performing the method of any one of the above examples.

In an example, an apparatus is configured to perform the method of any one of the above examples.

In another example, a system includes a system memory, a processor including a plurality of cores each coupled to the system memory, each core including an execution unit, logic to determine instruction width information associated with one or more instructions in a queue of instructions to be processed, and a current protection (IccP) controller to receive the instruction width information and to generate a license request that is associated with a current (Icc) anticipated to be drawn by the core based at least in part on the instruction width information. The system may be used to process instructions such as the one or more instructions in the queue of instructions to be processed.

In an example, the system further includes a power management unit (PMU) to receive the license request from each of the cores and to issue a respective license to each core based on the received license requests.

In an example, each core includes a respective data collection unit to provide to the IccP controller a power measure based on a weighted value of each of one or more instructions that are executed during an evaluation window, each weighted value based on corresponding instruction width information and corresponding instruction activity type of the instruction.

In an example, the IccP controller is to determine whether to throttle instruction throughput via the execution unit based on a comparison of the power measure to a threshold level.

In an example, the IccP controller is to determine, based on the comparison, whether to generate an updated license request for an updated Icc, the updated license request to be transmitted to the PMU.

In an example, responsive to receipt from the IccP controller of the updated license request, the PMU is to issue an updated license based on the updated license request, indicate to the IccP controller to cease throttling the instruction throughput, and indicate to the IccP whether to adjust at least one of a guard band voltage parameter and a core frequency of the core, based on the updated license request.

In another example, a system includes a system memory and a processor including a plurality of cores each coupled to the system memory, each core including an execution unit, logic means for determining instruction width information associated with one or more instructions in a queue of instructions to be processed, and a current protection (IccP) controller to receive the instruction width information and to generate a license request that is associated with a current (Icc) anticipated to be drawn by the core based at least in part on the instruction width information.

In an example, the system further includes power management means for receiving the license request from each of the cores and for issuing a respective license to each core based on the received license requests. In an example, the power management means includes a power management unit (PMU) for receiving the license request from each of the cores and for issuing the respective license to each core based on the received license requests.

In an example, each core includes a respective data collection unit to provide to the IccP controller a power measure based on a weighted value of each of one or more instructions that are executed during an evaluation window, each weighted value based on corresponding instruction width information and corresponding instruction activity type of the instruction.

In an example, the IccP controller is to determine whether to throttle instruction throughput via the execution unit based on a comparison of the power measure to a threshold level.

In an example, the IccP controller is to determine, based on the comparison, whether to generate an updated license request for an updated Icc, the updated license request to be transmitted to the power management means. In an example, the power management means is the PMU.

In an example, responsive to receipt from the IccP controller of the updated license request, the power management means is further for issuing an updated license that is associated with the updated license request, indicating to the IccP controller to cease throttling the instruction throughput, and indicating to the IccP controller whether to adjust at least one of a guard band voltage parameter and a core frequency of the core, based on the updated license request. In an example, the power management means is the PMU.

In another example, at least one machine readable medium has instructions stored thereon for causing a system to receive, at current protector (IccP) logic of a core of a processor, instruction width information associated with a widest instruction of a queue of instructions to be executed by the core, request from a power management unit (PMU) of the processor, a current (Icc) license that is associated with an anticipated Icc of the core, wherein the request is based at least in part on the received instruction width information, and receive, by the IccP logic, the IccP license responsive to the request.

In an example, the at least one machine readable medium has additional instructions stored thereon for causing the system to receive a power usage indicator that is associated with a measure of power consumed by the core resulting from execution of the instructions during an evaluation window, determine whether to throttle execution of subsequent instructions of the instruction queue based on a comparison of the power usage indicator to a threshold value, responsive to a determination to throttle execution of the subsequent instructions, request an updated IccP license from the PMU, and responsive to the request, receive the updated IccP license from the PMU.

In an example, the at least one machine readable medium has additional instructions stored thereon for causing the system to receive updated parameter values that specify at least one of an updated guard band voltage at which to operate the core and an updated frequency of the core responsive to the request.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores, wherein at least some of the plurality of cores comprise:
an execution unit; and
a current protection (IccP) controller to:
receive instruction width information associated with one or more instructions stored in an instruction queue prior to execution of the instructions by the execution unit;
determine an anticipated highest current level (Icc) for the core based on the corresponding instruction width information;
generate a request for a license for the core that is associated with the Icc; and
communicate the request to a power management unit (PMU); and
the PMU coupled to the plurality of cores to grant the license to the IccP controller in response to the request.

2. The processor of claim 1, wherein the PMU is to receive respective license requests from each of the plurality of cores and to grant corresponding licenses in response to the requests, wherein the corresponding licenses are determined at least in part based on a power capacity of the PMU.

3. The processor of claim 2, wherein the PMU is to determine a respective action to be taken by each of the cores based on the licenses granted and based on current power needs of each of the cores.

4. The processor of claim 3, wherein the PMU is to determine a first action to be taken by a first core, the first action including increasing a guard band voltage.

5. The processor of claim 3, wherein the PMU is to determine a first action to be taken by a first core, the first action including changing a first frequency of the at least one core.

6. The processor of claim 3, wherein the PMU includes firmware logic to determine the respective actions.

7. The processor of claim 1, wherein the IccP controller is further to determine the request based on activity type information associated with one or more of the instructions of the instruction queue.

8. The processor of claim 1, wherein the at least some of the cores further comprises data collection logic to provide to the IccP controller a power measure associated with execution by the execution unit of a portion of the one or more instructions and based on the corresponding activity type and the corresponding instruction width of each instruction that has executed during an evaluation window of time.

9. The processor of claim 8, wherein the IccP controller is to determine whether to throttle an execution rate of the core based at least in part on a comparison of the power measure to a threshold.

10. The processor of claim 8, wherein the IccP controller is to determine whether to request an updated license based on a comparison of the power measure to a threshold.

11. The processor of claim 10, wherein in response to a request of the updated license, the IccP controller is to receive the updated license that is associated with an updated highest anticipated current draw by the core, an updated guard band voltage for the core, and an updated core frequency for the core.

12. The processor of claim 1, further comprising out-of-order (OOO) logic to provide the corresponding instruction width information to the IccP controller prior to execution of the corresponding instruction.

13. A method comprising:
receiving, at current protector (IccP) logic of a core of a processor,
instruction width information associated with a widest instruction of a set of instructions to be executed by the core;
issuing a request from the IccP logic to a power management unit (PMU) of the processor, for a current (Icc) license that is associated with an anticipated Icc of the core, wherein the request is based at least in part on the received instruction width information;
receiving, by the IccP logic, the Icc license responsive to the request; and
controlling, by the IccP logic, execution of the set of instructions by an execution unit included in the core.

14. The method of claim 13, further comprising receiving a power usage indicator that is associated with a measure of power consumed by the core resulting from execution of the instructions during an evaluation window.

15. The method of claim 14, further comprising determining whether to throttle execution of subsequent instructions of the set of instruction based on a comparison of the power usage indicator to a threshold value.

16. The method of claim 15, further comprising:
responsive to a determination to throttle execution of the subsequent instructions, requesting an updated Icc license from the PMU; and
responsive to the requesting, receiving the updated Icc license from the PMU.

17. The method of claim 16, further comprising responsive to the requesting, receiving updated parameter values that specify at least one of an updated guard band voltage at which to operate the core and an updated frequency of the core.

18. A system comprising:
a system memory;
a processor comprising:
a plurality of cores each coupled to the system memory, each core comprising:
an execution unit;
logic to determine instruction width information associated with one or more instructions in a queue of instructions to be processed; and
a current protection (IccP) controller to receive the instruction width information and to generate a license request that is associated with a current (Icc) anticipated to be drawn by the core based at least in part on the instruction width information; and
a power management unit (PMU) to receive the license request from each of the plurality of cores and to issue a respective license to each core based on the received license requests.

19. The system of claim 18, wherein each core includes a respective data collection unit to provide to the IccP controller a power measure based on a weighted value of each of one or more instructions that are executed during an evaluation window, each weighted value based on corresponding instruction width information and corresponding instruction activity type of the instruction.

20. The system of claim 19, wherein the IccP controller is to determine whether to throttle instruction throughput via the execution unit based on a comparison of the power measure to a threshold level.

21. The system of claim 19, wherein the IccP controller is to determine, based on the comparison, whether to generate an updated license request, the updated license request to be transmitted to the PMU.

22. The system of claim 21, wherein responsive to receipt from the IccP controller the updated license request, the PMU is to:
issue an updated license based on the updated license request;
indicate to the IccP controller to cease throttling the instruction throughput; and
indicate to the IccP controller whether to adjust at least one of a guard band voltage parameter and a core frequency of the core, based on the updated license.

23. The processor of claim 1, wherein the IccP controller is to throttle an instruction feed rate to the execution unit, prior to receipt of the grant of the license.

\* \* \* \* \*